United States Patent
DeSanti et al.

(10) Patent No.: US 8,151,318 B1
(45) Date of Patent: Apr. 3, 2012

(54) METHOD AND APPARATUS FOR RELIABLY AND ASYMMETRICALLY DISTRIBUTING SECURITY INFORMATION WITHIN A FIBRE CHANNEL FABRIC

(75) Inventors: Claudio DeSanti, San Jose, CA (US); Silvano Gai, San Jose, CA (US); Fabio R. Maino, Palo Alto, CA (US); Maurilio Cometto, San Jose, CA (US); Sachin Jain, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1253 days.

(21) Appl. No.: 10/374,490

(22) Filed: Feb. 25, 2003

(51) Int. Cl.
G06F 17/30 (2006.01)
H04L 12/56 (2006.01)

(52) U.S. Cl. ............ 726/3; 370/389; 370/390; 370/244; 709/223; 709/224; 709/225; 709/238

(58) Field of Classification Search .................. 726/1–3; 713/150, 153; 709/220, 238, 213, 223–225; 370/351–353, 400–401, 235, 237–238, 254–258, 370/389–390, 244
See application file for complete search history.

(56) References Cited

U.S. PATENT DOCUMENTS

| | | | | |
|---|---|---|---|---|
| 6,003,137 A * | 12/1999 | Kawasaki | ........................ | 726/15 |
| 6,016,319 A * | 1/2000 | Kshirsagar et al. | ........... | 370/410 |
| 6,069,895 A * | 5/2000 | Ayandeh | ........................ | 370/399 |
| 6,353,612 B1 * | 3/2002 | Zhu et al. | ........................ | 370/360 |
| 6,385,196 B1 * | 5/2002 | Hayball et al. | ................ | 370/356 |
| 6,665,812 B1 * | 12/2003 | Blumenau et al. | ................ | 714/5 |
| 6,785,742 B1 * | 8/2004 | Teow et al. | ........................ | 710/1 |
| 6,885,677 B1 * | 4/2005 | Klevans | ........................ | 370/466 |
| 6,985,490 B2 * | 1/2006 | Czeiger et al. | ................ | 370/401 |
| 6,985,956 B2 * | 1/2006 | Luke et al. | ........................ | 709/229 |
| 7,036,013 B2 * | 4/2006 | Renganarayanan et al. | .. | 713/178 |
| 7,065,078 B2 * | 6/2006 | Hawkins et al. | ................ | 370/389 |

(Continued)

OTHER PUBLICATIONS

"Fibre Channel Switch Fabric—2 (FC-SW-2), REV 5.4", American National Standard for Information Technology, Jun. 26, 2001.

(Continued)

*Primary Examiner* — Yin-Chen Shaw
(74) *Attorney, Agent, or Firm* — Weaver Austin Villeneuve and Sampson LLP

(57) ABSTRACT

A reliable asymmetric method for distributing security information within a Fiber Channel Fabric. The Switching Fabric includes a set of security servers, which maintain among themselves a replicated copy of the Fabric security databases using the currently defined Merge and Change protocols. The other Switches of the Fabric are configured as client-Switches. They maintain only the subset of the authorization and authentication information required for their correct operation. A client-Switch queries the security server when a new end-device is connected to it, or when it is connected to the Fabric. When the security configuration of the Fabric changes by an administrative action, a security server solicits the client-Switches to update their information. In an alternative embodiment, the end-devices may query directly the security server, usually for authentication purposes. A Fabric with a plurality of security servers balances among them the load of inquiries from clients, and is more reliable because it continues to operate in the event of failure of one or more servers. Reliability is achieved in a stateless manner through the FSPF protocol, the Fiber Channel routing protocol. Each security server announces itself to the Fabric by advertising an adjacency to a predefined virtual Domain_ID in its FSPF LSRs. Clients access servers by directing queries to this virtual Domain_ID.

30 Claims, 8 Drawing Sheets

U.S. PATENT DOCUMENTS

| | | | |
|---|---|---|---|
| 7,068,667 B2* | 6/2006 | Foster et al. | 370/398 |
| 7,164,656 B2* | 1/2007 | Foster et al. | 370/235 |
| 7,173,929 B1* | 2/2007 | Testardi | 370/355 |
| 7,216,175 B1* | 5/2007 | Sitaraman et al. | 709/229 |
| 7,236,496 B2* | 6/2007 | Chung et al. | 370/401 |
| 7,343,410 B2* | 3/2008 | Mercier et al. | 709/225 |
| 2003/0084219 A1* | 5/2003 | Yao et al. | 710/300 |
| 2003/0103504 A1* | 6/2003 | Dugan et al. | 370/392 |
| 2003/0137941 A1* | 7/2003 | Kaushik et al. | 370/241 |
| 2003/0189930 A1* | 10/2003 | Terrell et al. | 370/389 |
| 2004/0001497 A1* | 1/2004 | Sharma | 370/401 |
| 2004/0022199 A1* | 2/2004 | Hammons et al. | 370/254 |
| 2004/0028063 A1* | 2/2004 | Roy et al. | 370/402 |
| 2004/0047294 A1* | 3/2004 | Ain et al. | 370/238 |
| 2004/0071134 A1* | 4/2004 | Vadivelu | 370/373 |
| 2004/0233921 A1* | 11/2004 | Krieg et al. | 370/406 |

OTHER PUBLICATIONS

Hofer, "Fabric Binding and Security Membership Data Distribution", McData, Broomfield CO., Dec. 3, 2002.

Kipp, "Stage Fabric Configuration Update (SFC) Request", McData, Broomfield CO., Dec. 5, 2002.

* cited by examiner

| Originating Switch Domain_ID: 2 | | |
|---|---|---|
| Neighbor Domain_ID | Link_ID | Cost |
| 1 | B | 500 |
| 3 | A | 500 |
| 7 | C | 500 |

FIG. 3

Routing Table for Switch X2

| Domain ID | Area ID | Port ID | Exit Port |
|---|---|---|---|
| 1 | N/A | N/A | B |
| 3 | N/A | N/A | A |
| 4 | N/A | N/A | A |
| 5 | N/A | N/A | B |
| 6 | N/A | N/A | B |
| 7 | N/A | N/A | C |
| 8 | N/A | N/A | A |
| 9 | N/A | N/A | C |
| 2 | 1 | 1 | X |
| 2 | 2 | 3 | Y |

FIG. 4

Originating Switch Domain_ID: 1

| Neighbor Domain_ID | Link_ID | Cost |
|---|---|---|
| 2 | B | 500 |
| 3 | Q | 500 |
| 4 | F | 500 |
| 5 | G | 500 |
| 6 | H | 500 |
| 7 | R | 500 |
| 8 | O | 500 |
| 9 | P | 500 |
| FE | XX | 50000 |

*FIG. 6A*

Originating Switch Domain_ID: 9

| Neighbor Domain_ID | Link_ID | Cost |
|---|---|---|
| 1 | P | 500 |
| 7 | M | 500 |
| 6 | N | 500 |
| FE | XZ | 50000 |

*FIG. 6B*

Originating Switch Domain_ID: 8

| Neighbor Domain_ID | Link_ID | Cost |
|---|---|---|
| 1 | O | 500 |
| 3 | L | 500 |
| 4 | K | 500 |
| FE | XY | 50000 |

*FIG. 6C*

| | Originating Switch Domain_ID: FE | | |
|---|---|---|---|
| Neighbor Domain_ID | Link_ID | Cost | |
| 1 | XX | 50000 | |
| 8 | XY | 50000 | |
| 9 | XZ | 50000 | |

*FIG. 8*

| Domain ID | Area ID | Port ID | Exit Port |
|---|---|---|---|
| 1 | N/A | N/A | P |
| 2 | N/A | N/A | M |
| 3 | N/A | N/A | P |
| 4 | N/A | N/A | P |
| 5 | N/A | N/A | N |
| 6 | N/A | N/A | N |
| 7 | N/A | N/A | M |
| 8 | N/A | N/A | P |
| 9 | 1 | 1 | W |
| 9 | 1 | 2 | Z |
| 9 | N/A | N/A | Control Plane |
| FE | N/A | N/A | Control Plane |

*FIG. 9*

METHOD AND APPARATUS FOR RELIABLY AND ASYMMETRICALLY DISTRIBUTING SECURITY INFORMATION WITHIN A FIBRE CHANNEL FABRIC

BACKGROUND OF THE INVENTION

1. Field of the Invention

The present invention relates to storage area networks, and more particularly, to a reliable asymmetric method for distributing security information within a Fibre Channel Fabric.

2. Background of the Invention

With the increasing popularity of Internet commerce and network centric computing, businesses and other organizations are becoming more and more reliant on information. To handle all of this data, storage area networks or SANs have become very popular. A SAN typically includes a number of storage devices, a plurality of Hosts, and a number of Switches arranged in a Switching Fabric that connects the storage devices and the Hosts.

Most SANs rely on the Fibre Channel protocol for communication within the Fabric. For a detailed explanation of the Fibre Channel protocol and Fibre Channel Switching Fabrics and Services, see the Fibre Channel Framing and Signaling Standard, Rev 1.70, American National Standard of Accredited Standards Committee (INCITS), Feb. 8, 2002, and the Fibre Channel Switch Fabric—2, Rev. 5.4, INCITS, Jun. 26, 2001, and the Fibre Channel Generic Services—3, Rev. 7.01, INCITS, Nov. 28, 2000, all incorporated by reference herein for all purposes.

In Fibre Channel, each device (Hosts, storage devices and Switches) is identified by an unique eight (8) byte wide Node_Name assigned by the manufacturer. When the Fibre Channel devices are interconnected to form a SAN, the Node_Name (along with other parameters) is used to identify each device. Fibre Channel frames are used for communication among the devices in the SAN. The Node_Name, however, is not used by the frames. Instead the Fibre Channel Port of each end device (Hosts and storage devices) is addressed via a three (3) byte Fibre Channel address (or FC_ID), allocated dynamically to the end devices by the Fabric.

Fibre Channel Fabrics use several kinds of databases replicated among all the Switches, such as the Zoning database. In some cases the information contained in these databases is relatively static, meaning that it changes only by way of an administrative action. An example of such information is the security information needed to maintain and enforce security within the Fabric.

Security information within a Fibre Channel Fabric performs two basic roles, authorization and authentication. Authorization determines which devices in the Fabric can perform which functions. Authentication involves the confirmation that devices connected to the SAN, such as Switches, Hosts and storage devices, are who they claim to be. With the current Fibre Channel standards, security is only partially addressed. Specifications exist to solve the authorization issue, but not to address the authentication issue, although work is on-going in the FC-SP working group of INCITS committee T11 to address this issue. Authorization is managed by organizing the Fibre Channel SAN into zones.

Within each zone, Hosts can see and access only storage devices or other Hosts belonging to that zone. This allows the coexistence on the same SAN of different computing environments. For example, it is possible to define on a SAN a Unix zone and a separate Windows zone. Unix servers belonging to the Unix zone may access only storage or Hosts devices within the Unix zone, and do not interfere with the other devices in other zones connected to the SAN. In the same manner, Windows servers belonging to the Windows zone may access storage or Hosts devices only within the Windows zone, without interfering with the other devices in other zones connected to the SAN. The SAN administrator may define in a SAN multiple zones, as required or dictated by the computing and storage resources connected to it. The Switching Fabric allows communications only between devices belonging to the same zone, preventing a device of one zone from seeing or accessing a device of another zone.

To enforce a zoning definition, each Switch in the Fabric maintains a zone database that lists which Hosts can access which storage devices in the Fabric. The FC-SW-2 standard defines the Switch-to-Switch interactions required to ensure that each Switch has a consistent version of this information.

When two Switches are connected together, the Zone Merge Protocol ensures they have compatible zoning information. In general terms, they exchange their own version of the Zone database, and then each of them verifies that the received information is compatible with the local copy. If the definitions of the zones are compatible, the link between the Switches will be used to route traffic, otherwise that link will be isolated and not used.

To update or change a zone configuration within a Fabric, FC-SW-2 defines the Zone Change Protocol. With this protocol, the Switch that wishes to propagate its zoning configuration over the other Switches of the Fabric is called the "managing Switch", while the others are called "managed Switches". The Zone Change Protocol implements a four step process to distribute a zone change across the Switching Fabric. In general terms, the managing Switch locks the other Switches of the Fabric (step 1); propagates the changes across the Fabric to the other Switches (step 2); commits those changes (step 3); and then releases the lock on the Fabric (step 4).

In trying to solve the authentication problem, the same approach has been proposed in the FC-SP working group for maintaining authentication information. As proposed, each entity that wishes to access another entity is required to authenticate itself before obtaining the right to access that entity. Each Switch would be required to maintain a database of authentication information for each Switch, Host or storage device present in the SAN. Depending on the authentication protocol used, this authentication information may be a set of passwords or digital certificates. When two Switches are connected they would have to ensure, with a Merge Protocol, that their authentication information are compatible. When the SAN administrator wishes to change the authentication information in the Fabric, a Change Protocol may be used to perform this operation.

Several problems are associated with the aforementioned process of security information distribution when applied to a large Fabric. Foremost, the security information database, both for authorization (zoning) and authentication, needs to be replicated on each Switch of the Fabric. Both databases contain information relative to the entire SAN. However, each Switch only needs to know the subset of this information relevant to the devices directly attached to it. Furthermore, it has been observed in the field that the zoning database alone may become excessively large in a big Fabric, posing an undue burden on the memory and processing capabilities of the Switches in the Fabric. An authentication database containing the security information required to authenticate potentially each device of a SAN is potentially much larger than an authorization database. As a consequence, using the same approach to handle the authentication information will exacerbate the problem, creating even a greater burden on the memory and processing capabilities of the Switches. Since not all the Switches in the Fabric may have the necessary memory or processing capabilities, it may be more difficult to scale the security information databases across large SANs using the currently defined mechanisms.

Therefore, a reliable asymmetric method for distributing security information within a Fibre Channel Fabric is needed in order to improve the scalability properties of a Fibre Channel SAN.

SUMMARY OF THE INVENTION

To achieve the foregoing, and in accordance with the purpose of the present invention, a reliable asymmetric method for distributing security information within a Fibre Channel Fabric is disclosed. The Switching Fabric includes a set of security servers, which maintain among themselves a replicated copy of the Fabric security databases using the currently defined Merge and Change protocols. The other Switches of the Fabric are configured as client-Switches. They maintain only the subset of the authorization and authentication information required for their correct operation. A client-Switch queries the security server when a new end-device is connected to it, or when it is connected to the Fabric. When the security configuration of the Fabric changes by an administrative action, a security server solicits the client-Switches to update their information. In an alternative embodiment, the end-devices may query directly the security server, usually for authentication purposes. A Fabric with a plurality of security servers balances among them the load of inquiries from clients, and is more reliable because it continues to operate in the event of failure of one or more servers. Reliability is achieved in a stateless manner through the FSPF protocol, the Fibre Channel routing protocol. Each security server announces itself to the Fabric by advertising an adjacency to a predefined virtual Domain_ID in its FSPF LSRs. Clients access servers by directing queries to this virtual Domain_ID.

BRIEF DESCRIPTION OF THE DRAWINGS

FIG. 3 is diagram of an LSR of one of the Switches in the Fabric of FIG. 1.

FIG. 4 is a routing table of a Switch in the Switching Fabric.

FIGS. 6A through 6C are LSRs for server-Switches in the asymmetric Switching Fabric of the present invention.

FIG. 8 is an exemplary LSR describing a virtual Switch within the asymmetric Switching Fabric of the present invention.

FIG. 9 is a routing table of a Server Switch in the Switching Fabric.

Like reference numbers refer to like elements in the figures.

DETAILED DESCRIPTION OF THE PREFERRED EMBODIMENTS

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Figure 1:
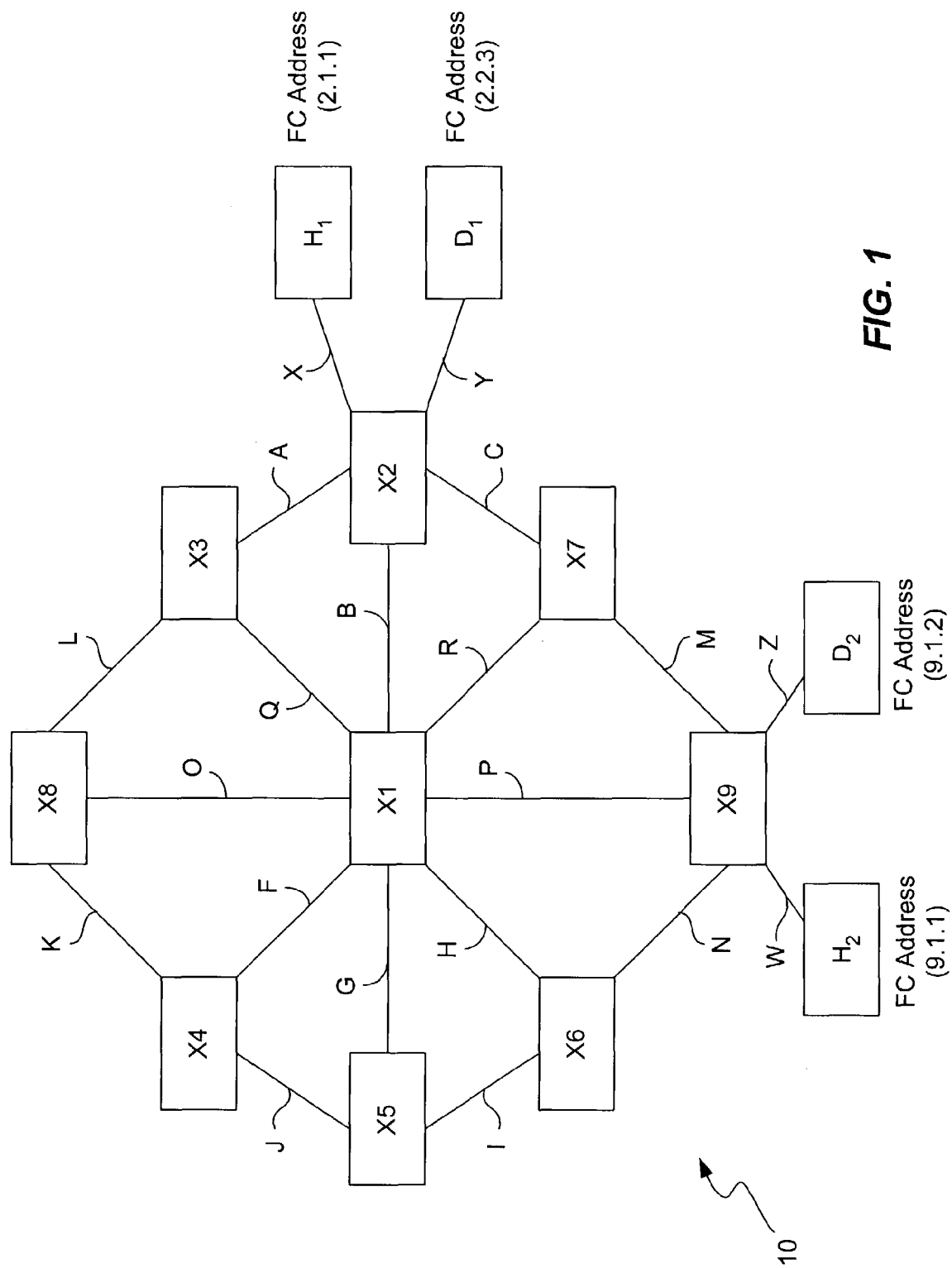
FIG. 1 is a diagram of a Switching Fabric.

Referring to FIG. 1, a Fibre Channel Switching Fabric is shown. The Fabric 10 includes a number of Switches numbered X1 through X9. Each of the Switches X is connected to a neighbor Switch by a link. The links connecting the Switches X1 through X9 are labeled A through R. Also shown in the figure are host $H_1$ and storage device $D_1$ connected to Switch X2 through links X and Y respectively. Host $H_2$ and storage device $D_2$ are connected to Switch X9 through links W and Z respectively. The host $H_1$ and $H_2$ can be according to various embodiments of the invention any of a number of different types of hosts, such as servers or personal computers running one of a number of different operating systems such as Unix, Linux or Windows. Two storage devices $D_1$ and $D_2$ can be any type of storage device including but not limited to a Redundant Array of Independent Disks (RAID), tape back-up systems, emulated tape back-up systems, CD-ROM storage arrays, etc. It should be noted that the configuration of Switches X1 through X9, hosts $H_1$ and $H_2$, and storage devices $D_1$ and $D_2$ as shown is merely exemplary. The number of Switches X, hosts and storage devices and their particularly arrangement was arbitrarily selected for the purpose of illustrating and describing the present invention. This particular arrangement should in no way be construed as somehow limiting the invention.

The Fabric 10 forwards FC frames based on the destination address (D_ID) field of the Fibre Channel header. Fibre Channel addresses are dynamically assigned by the Fabric to the end devices. When a Fibre Channel address identifies an end device, the three bytes composing the address have the format <Domain_ID>, <Area_ID>, <Port_ID>. The Domain_ID part of the address identifies the Switch to which the end device is connected, while the combination of Area_ID and Port_ID identifies specifically that end device in the scope of that Switch. For example, the host $H_1$ and storage device $D_1$ are identified with FC addresses (2.1.1) and (2.2.3) respectively. This implies that they are both connected to Switch X2 having Domain_ID 2. A FC frame having a destination address of (2.1.1) will be forwarded by the Fabric to $H_1$ and a FC frame having a destination address of (2.2.3) will be forwarded to $D_2$ respectively. Each Switch performs the forwarding function by looking at the Domain_ID part of the address, and then delivering the FC frame to the Switch having that Domain_ID. When a Switch receives a FC frame addressed to its Domain_ID, it looks at the Area_ID and Port_ID part of the FC_ID to deliver the FC frame to the appropriate end device. As an example, if Switch X9 receives a FC frame directed to the FC address (2.1.1), it looks at the Domain_ID part of the address (2), and forwards the frame to Switch having that Domain_ID (Switch X2). When Switch X2 receives that FC frame, it looks at the Area_ID and Port_ID parts of the address to deliver it to H1.

The Fabric 10 also processes FC frames for Switch-to-Switch communication. A Switch in a Fabric is addressable with a specific FC address, called a Domain Controller address, that has the format FF.FC.<Domain_ID>. The first two bytes (FF.FC) have a fixed value, while the Domain_ID is encoded in the third byte of the Switch to be addressed. Switches are aware of this particular address structure so if they receive a FC frame addressed to a Domain Controller address, they automatically extract the Domain_ID from the third byte. The processing of the frame is thereafter the same as the previous case: if the destination Domain_ID is the Switch's Domain_ID, the Switch processes the frame. Otherwise the receiving Switch forwards the frame to the Switch having the addressed Domain_ID. As an example, each Switch X1 through X9 in the Fabric 10 can be reached or addressed by using the FC addresses FF.FC.1 through FF.FC.9 respectively.

Figure 2A:
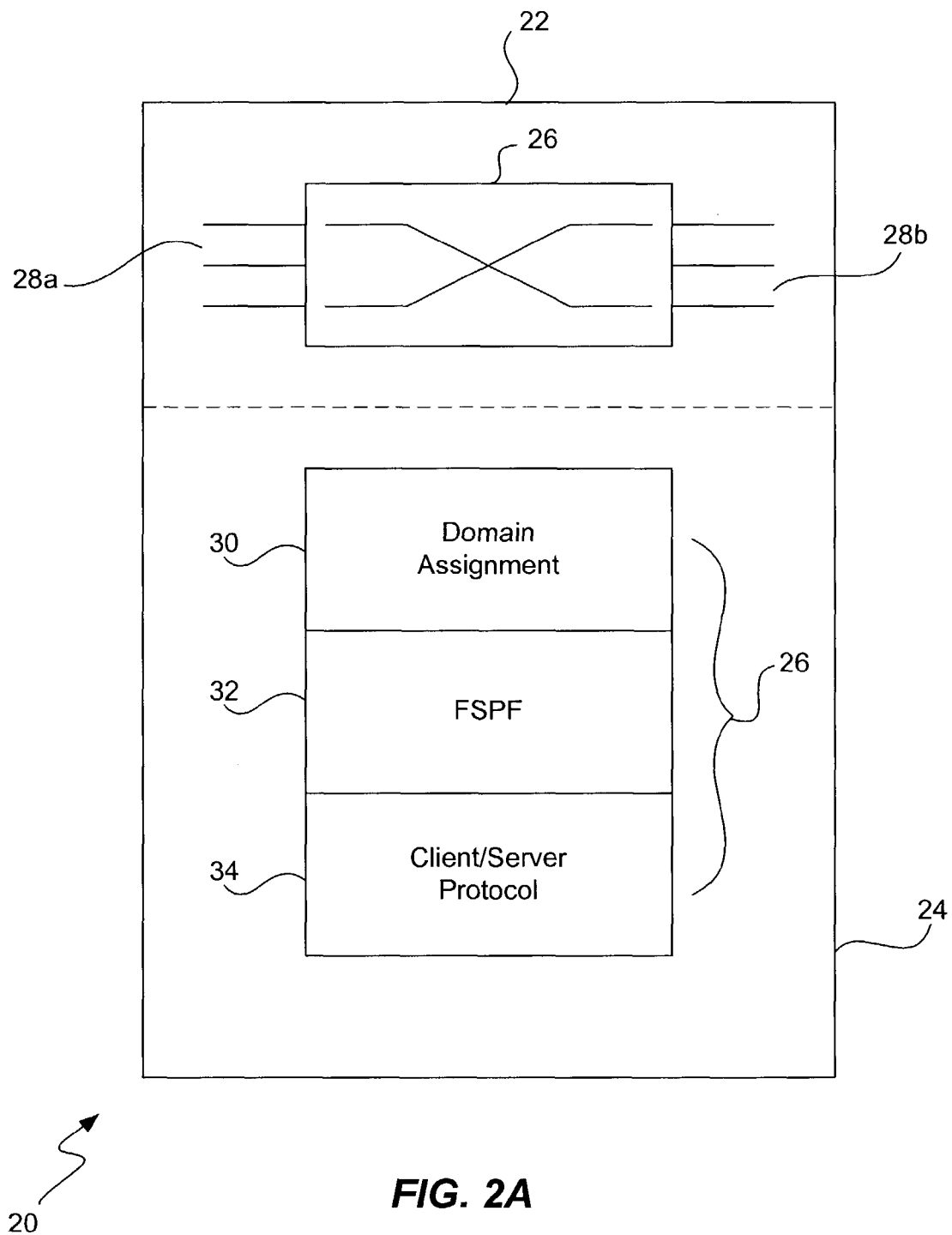
FIG. 2A is a block diagram of a server-Switch of the present invention.
Figure 2B:
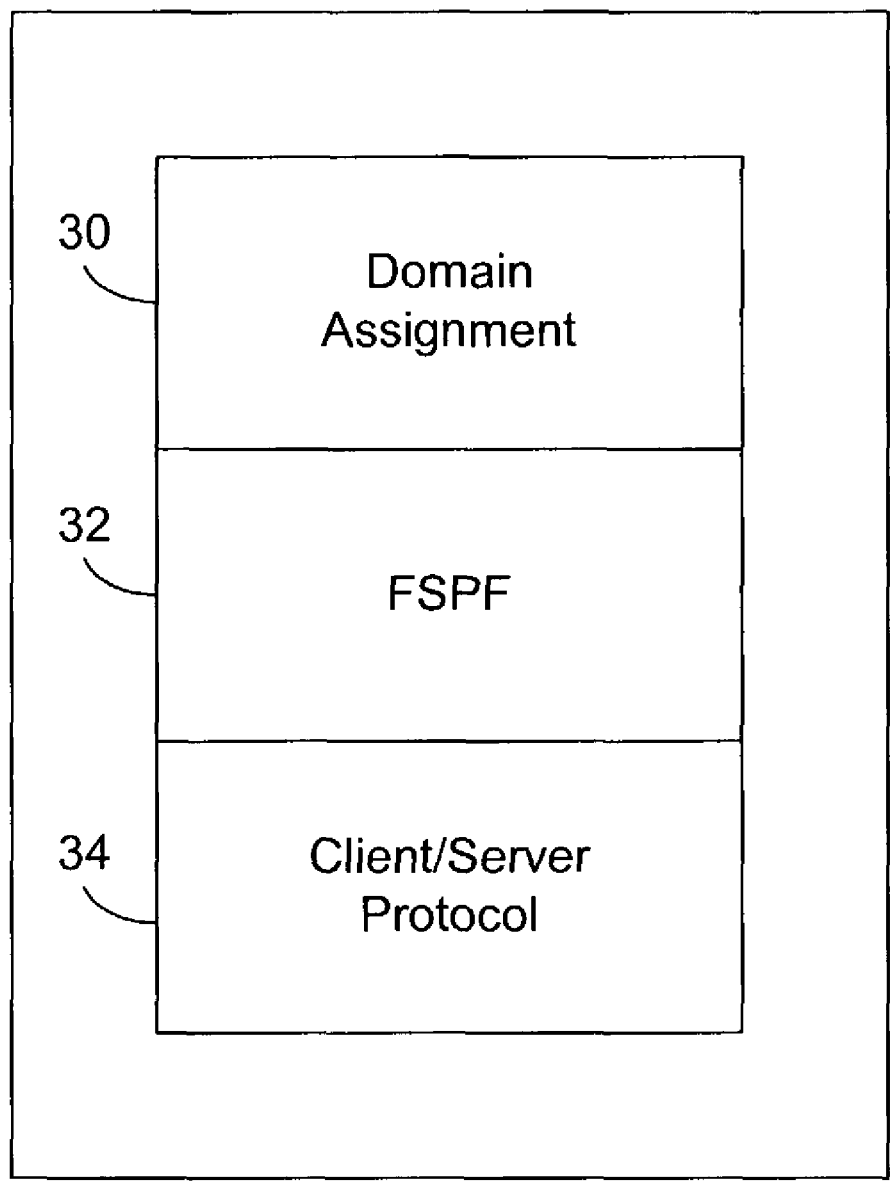
FIG. 2B is a block diagram of a server appliance of the present invention.

Referring to FIG. 2A, an exemplary block diagram of one of the Switches X1 through X9 in the Switching Fabric is shown. The Switch 20 operates in two planes, the data plane 22 and the control plane 24. In the data plane 22, the Switch 20 includes switching logic 26 that is connected to two sets of ports 28a and 28b. The switching logic 26 is configured to route or internally switch traffic received on one port 28a to another port 28b and vice versa. The control plane 24 includes control state machines 30, 32, 34 for implementing Domain_IDs assignment, the FSPF protocol, and the client/server protocols of the present invention. In an alternative embodiment, the switching plane 22 can be removed from a Switch X and the resulting device can provide only the control function, hereafter referred to as a server appliance, as illustrated in FIG. 2B. In various other embodiments of the invention, the state machines 30, 32 and 34 can be implemented in hardware, programmable logic, or using a microcontroller and software, or a combination thereof.

The domain assignment state machine 30 is responsible for assigning Domain_IDs to each of the Switches X in the Fabric 10. Usually, when the Switching Fabric 10 is initialized, one of the Switches X is selected as the Principal Switch. The Principal Switch assigns the Domain_IDs to all the other Switches in the Fabric. After having received a Domain_ID, the individual Switches assign the Area_IDs and Port_IDs for each end device (either a host or a storage device) in its Domain. The Fabric configuration is considered defined when all the Switches have been assigned a Domain_ID and all the end devices are all assigned their Area_IDs and Port_IDs.

Once the Domain IDs for the Fabric 10 are assigned, the domain assignment state machine 30 continues to run. If a Switch is removed or added, the state machine 30 makes sure that the Domain_IDs across the Fabric 10 are updated as necessary.

The FSPF state machine 32 is responsible for building the routing tables for each of the Switches in the Fabric 10. During operation, the FSPF state machine 32 of each Switch periodically announces its presence using a Switch-to-Switch communication to all of its immediate neighbor Switches (i.e., all the Switches it is directly connected to) in the Fabric 10. Based on the announcements received from the neighbor Switches, FSPF is able to recognize the Domain_IDs of the adjacent Switches. Each Switch encodes this information in a Link State Record (LSR). The LSR is a table generated by each Switch, including the Domain_ID of the generating Switch and a list of the Domain_IDs of the adjacent Switches.

Referring to FIG. 3, a simplified LSR 36 for Switch X2 is shown. The field 37 identifies the generating Switch, X2. Fields 38a-38c list the Domain_ID of the neighbor, Link_ID, and Cost respectively. In this example, the Domain_IDs of the neighbors of X2 are 3, 1 and 7. The Link_ID provides the link identifier to reach each neighbor. The cost is an administrative value assigned by the network administrator and used by the FSPF protocol. The purpose of the cost is to describe a link in comparison to another link: a link with a lower cost is considered better than a link with a higher cost. FSPF computes the paths with the minimal cost as the best paths for communications across the Fabric. Once an LSR is constructed, it is flooded across the Fabric 10. Each Switch of the Fabric announces its presence by flooding its LSR, describing the topology of its neighbors in the Fabric. Each Switch in the Fabric also maintains a database of the LSRs received from all the other Switches in the Fabric 10. The aggregate of the LSRs in the database represents the complete topology of the Fabric 10. From the LSR database, each Switch computes the best path to all the other Switches in the Fabric 10. A routing table of each Switch is constructed by the FSPF state machine 32 of each Switch based on the computed best path information. It should be noted that the FSPF state machine 32 is continuously running for each Switch. In the event a Switch goes down, or a new Switch is added or removed from the Fabric 10, the LSRs and routing tables for all the Switches in the Fabric are updated.

Referring to FIG. 4, an exemplary routing table for a Switch X2 in the Fabric 10 is shown. The routing table 40 includes a Domain_ID column 42, an Area_ID column 44, a Port_ID column 46, and an output Port column 48. All of the Domain_IDs in the Fabric 10 are listed in the Domain_ID column 42. For the Domain_IDs 1, 3, 4, 5, 6, 7, 8 and 9 (all the Domain_IDs except Domain_ID 2), the output Port column 48 includes an entry for the port A through R that defines the most direct path to the corresponding Domain_ID. For example, Port A provides the most direct path to Domain_ID 8 (through Switch X3). Port B defines the most direct path to Domain_ID 1. For Domain_ID 2, the Area_ID, Port_ID and output Port are provided for each end device connected to Switch X2. In this example, Area_ID, Port_ID, and output Port for $H_1$ are $(1.1, X)$ and $(2.3, Y)$ for $D_1$. The last row of the routing table is provided for handling control FC frames, i.e., the frames carrying the messages to be handled by the control plane of the Switch. In this example, a FC frame addressed to the domain controller address of Switch 2 (FF.FC.2) matches this entry and is passed to the control plane 24 to be processed. It should be noted that the routing tables for Switches X1 and X3 through X9 are created in the identical way as described above. For the sake of simplicity, however, the actual routing tables for each of these Switches is not provided herein.

The routing table is used by the data plane 22 of each Switch to route frames across the Fabric 10. When a Switch receives a FC frame, the destination Domain_ID is extracted from the destination address of the frame. As previously explained, if the FC address is an end device address, then the Domain_ID is extracted from the first byte of the address. If the FC address is a Domain Controller address, then the Domain_ID is extracted from the third byte of the address. The extracted Domain_ID is used to perform a lookup in the routing table. If the destination Domain_ID is different from the Switch's own Domain_ID, the appropriate row in the routing table is matched, and the frame is forwarded to the corresponding output port. If the destination Domain_ID is equal to the Switch's own Domain_ID and the destination address is an end device address, the appropriate row, considering the Area_ID and Port_ID part of the address, is located in the routing table. The frame is forwarded to the corresponding output port toward the destination end device. If the destination Domain_ID is equal to the Switch's own Domain_ID and the destination address is a Domain Controller address, the frame is forwarded to the control plane 24 of the Switch for further processing.

The Asymmetric Solution

Up to now, the usual behavior of a set of Fibre Channel Switches arranged in a Fabric has been described. As explained in the Background of the Invention, the current approach to handle security information is to replicate the security information across all the Switches of a Fabric. As a consequence, all the Switches are equal, or "symmetric", in term of functionality. With the present invention in contrast, the Switches do not all maintain the same or equal functionality and security information. The present invention is therefore considered an asymmetric solution.

According to various embodiments of the invention, the client/server protocol 34 is used to configure one or more of the Switches X (FIG. 2A) or server appliances (FIG. 2B) in the Fabric to implement the functionality of a security server. The non-server Switches in the Fabric 10 are considered "client" Switches. The security servers simplify and make more scalable the management of an authorization database (e.g., zone database) and of an authentication database, by replacing the Merge and Change protocols with a simpler client-server protocol. Security servers and client-Switches perform different, or asymmetrical, functions with respect to one another within the Fabric 10. Specifically, security servers maintain replicated copies of the security databases and rely on the Merge protocol to harmonize their security databases. Security servers also propagate among themselves updated configurations using the Change protocol to implement security database changes across the Fabric 10. In addition, Security servers also implement a simple client-server protocol required to communicate with client-Switches in the Fabric. Server switches therefore require sufficient memory and processing capabilities to handle both the security server and switching responsibilities.

In contrast, client-Switches are simplified. Client-Switches do not maintain a Fabric-wide security database. As such, they do not implement the Merge or Change protocols. Both of these protocols are instead replaced by the client-server protocol. Each client-Switch maintains only a subset of the Fabric authentication and authorization databases. This subset includes only the information required to enforce security among the Nx_Ports (the end devices) directly connected to the Switch. By looking at the end devices directly connected to them, the client-Switches determine by themselves which subset of information they need to enforce security within the Fabric.

Figure 5A:
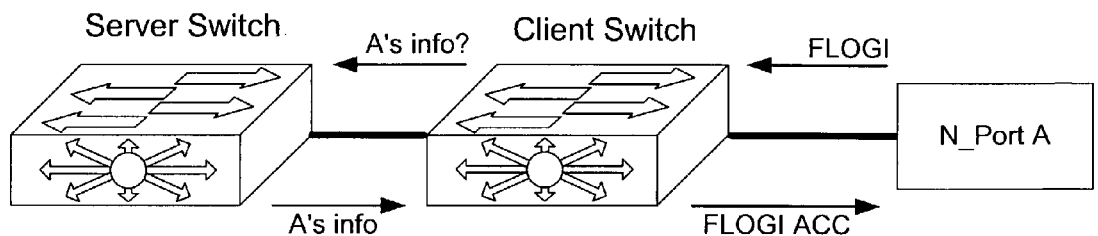
FIGS. 5A through 5C illustrate various uses of the client-server protocol used within the asymmetric switching Fabric of the present invention.
Figure 5B:
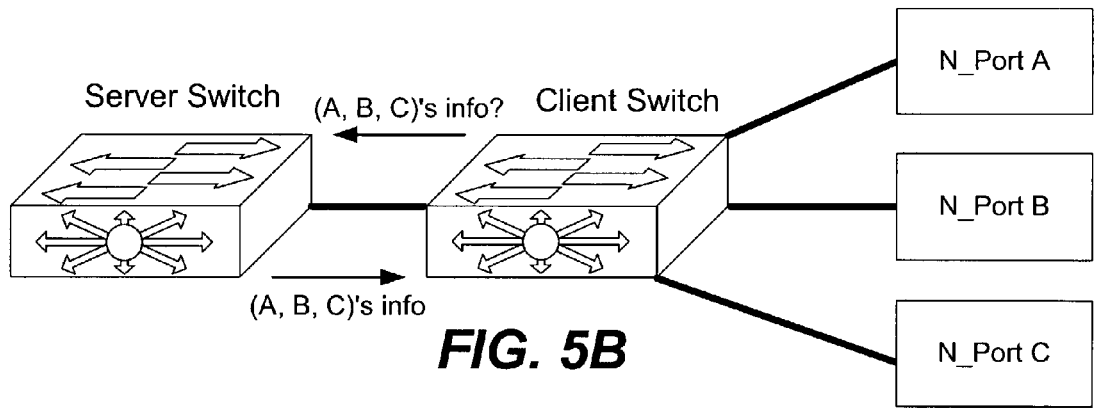
Figure 5C:
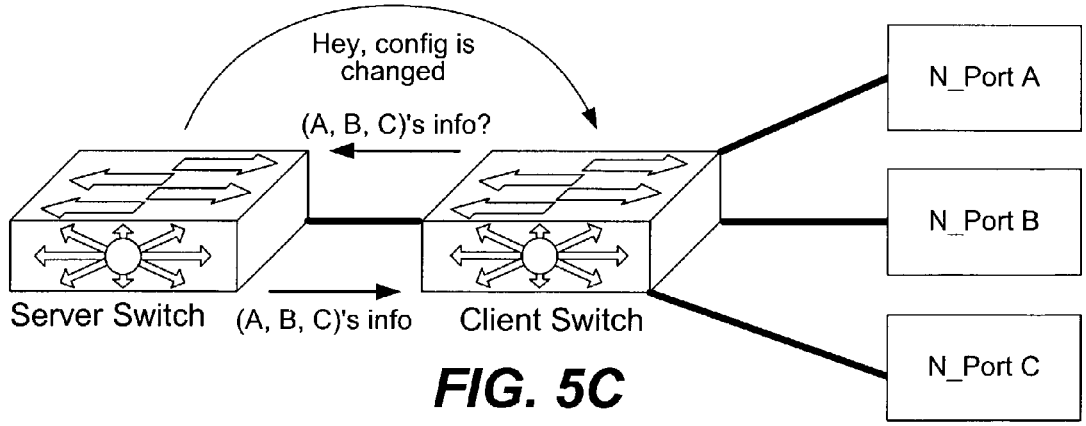

When a client-Switch needs the security information relative to one or more specific end devices, it sends a query to a security server. The query specifies all the ways in which end-devices may be identified (i.e, N_Port_Name, Node_Name, F_Port_Name, FC_ID, etc.). The client server protocol is normally used in the following cases:

a) When an Nx_Port is connected to a client-Switch. In one embodiment the client server protocol may be invoked when the Nx_Port performs a FLOGI with a client-Switch. FLOGI is the process by which an end device is admitted or becomes part of the Fabric. The Nx_Port sends to the Switch a FLOGI request which provides its credentials to the Switch. If the Switch accepts the request, it provides an FC_ID to the Nx_Port in the reply. As depicted in FIG. 5A, when the client-Switch receives the credentials of the Nx_Port A in an FLOGI message, it requests to a security server the security information relevant for Nx_Port A. The server provides the requested security information to the client-Switch, which uses it to set up an eventual zoning enforcement or to further authenticate the Nx_Port. Only then the FLOGI is accepted and the end device admitted as part of the Fabric. In another embodiment, the client server protocol may be invoked after the FLOGI, if an explicit authentication protocol has to be used to authenticate the Nx_Port to the Fabric. In such a case the client Switch may ask the security server to validate the information provided by the Nx_Port. Depending on the answer from the security server, the client Switch may then grant or deny access to the Fabric to the Nx_Port.

b) When a client-Switch joins a Fabric. As depicted in FIG. 5B, the client-Switch requests to a security server the security information relevant for all the Nx_Port directly connected to it. The server provides the requested security information to the client-Switch. The request is the same as in (a), but with more than one Nx_Port identified.

c) When the security databases are changed by an administrative action. In such a case as illustrated in FIG. 5C, the security servers use the Change protocol to distribute among themselves the updated security information. By virtue of the Change Protocol, a managing Switch is selected among the security servers. The managing Switch delivers the updated security information to the other security servers and solicits the Client-Switches to update their information with a solicitation message. Following this solicitation, a client-Switch performs the same request described in (b) above.

Each client-Switch enforces the Zone definitions and uses the authentication information that it receives from a security server. As with any client-server approach, if no servers are available, the protocol does not work anymore. Given that the security information is relatively static, and that all security servers in the Fabric maintain a consistent copy of the security databases, it is not important which particular security server provides this information. By using a virtual Domain_ID as described below, a highly reliable client-server scheme for distributing security information across a fabric is provided.

A client is able to communicate with a server by using a Domain Controller address associated with a predefined virtual Domain_ID. This Domain_ID is virtual because it is not associated with any real Switch. The Domain assignment state machine considers the values from hex'F0 (240) to hex'FF (255) as reserved, so they will never be assigned to any real Switch. According to the present invention, one of these reserved values is used as the Domain_ID identifying the security servers. As an example, Domain_ID FE is used as the virtual Domain_ID for the security servers in the Fabric 10. Thus each client is able to communicate with a server by sending its requests to the Domain Controller address FF.FC.FE. The answering server will reply to the requesting client. In alternative embodiments, the other reserved values F0 through FF may be used, or also any other non-reserved value may be used.

Figure 7:
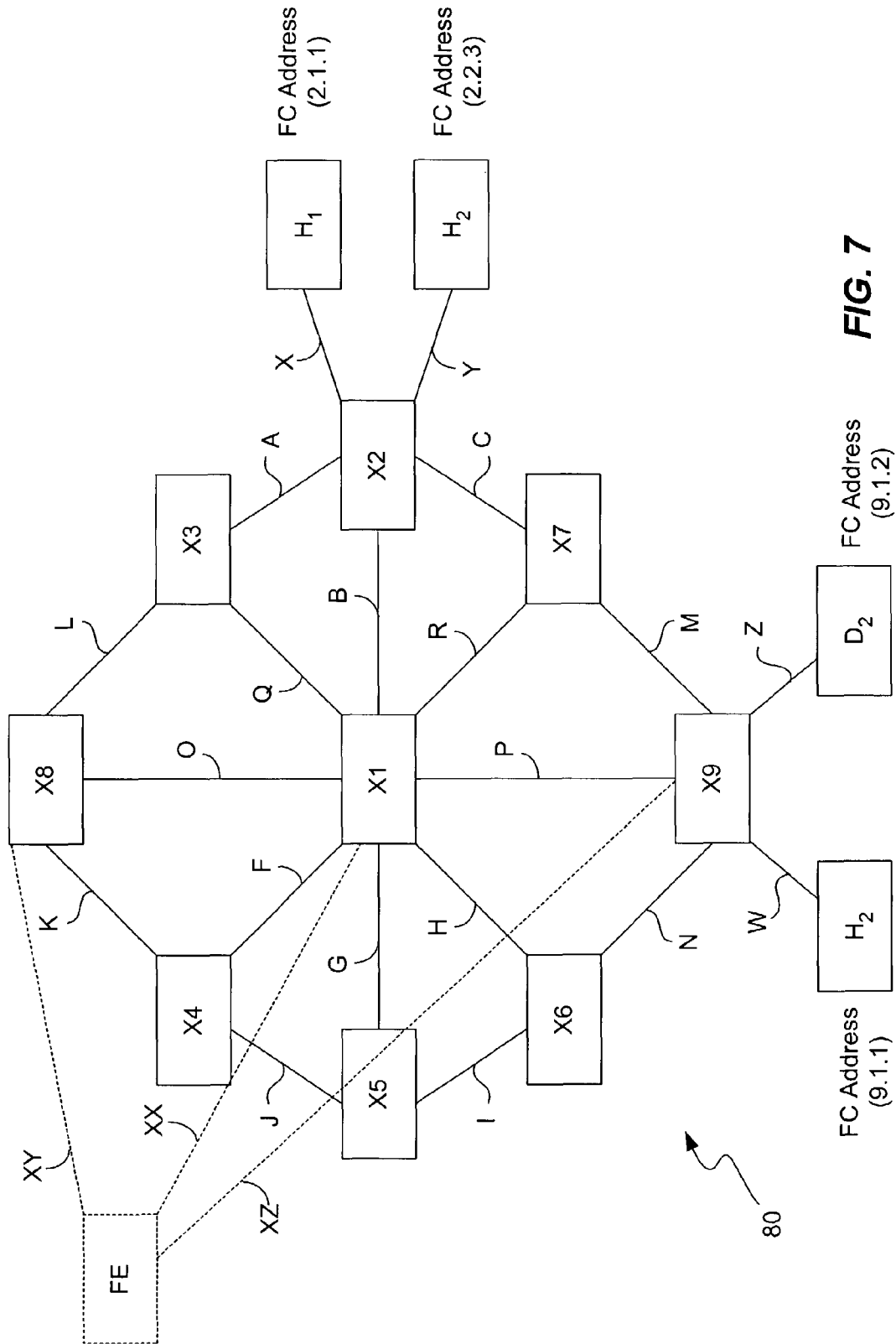
FIG. 7 is a diagram of the asymmetric Switching Fabric according to the present invention.

Each security server advertises its presence in the Fabric by announcing in its FSPF LSR an adjacency to the virtual Domain_ID FE. Usually the best place in which to position a server in a Fabric topology is in the most central position. Referring again to FIG. 1, assume that Switch X1, X9 and X8 are configured as server-Switches. The LSRs generated by the three server-Switches in this case are depicted respectively in FIGS. 6A through 6C respectively. As shown, the connection with the virtual Domain_ID FE must be advertised with a much higher cost than the other links (for example 50,000 versus 500) to ensure that no Switch will select the virtual links for paths to Domain_IDs other than FE. No other Switch (i.e., the client Switches) in the Fabric advertises an adjacency to the virtual Domain_ID FE. The resulting Fabric topology 80, as advertised by the LSRs of all the Switches or appliances, is illustrated in FIG. 7. As shown, each server Switch X1, X8 and X9 is described as adjacent to the virtual Switch having Domain_ID FE. In order to complete the topology definition of the Fabric 80, an LSR for the virtual Switch FE has to be generated, since each Switch is required to generate and flood its LSR across the Fabric. Each server is able to recognize the other servers in the Fabric 10 from the FSPF database by finding the connected Domain_IDs which have a link to FE in their LSR. Given that, a simple selection rule may be used to select one of the servers as the one in charge of generating the LSR for the virtual Domain_ID FE. For example, the server with the lowest Domain_ID among the active servers can be designated as responsible for generating the LSR for the virtual Switch FE. Such an LSR is depicted in FIG. 8. If the selected server goes down or gets disconnected, the FSPF protocol allow the other servers to detect such an event, and select another server to generate the LSR for the virtual Domain_ID. This provides reliability.

To handle the messages sent toward the virtual Switch FE, each server will have an additional entry in its routing table. The additional entry is used to forward all the traffic going directed to Domain_ID FE to the control plane 24 of the Switch or server appliance for processing. As an example, FIG. 9 depicts the routing table for the server-Switch X9. Note the last two entries define the control Plane as the Exit port for Domain_IDs 9 and FE respectively.

This mechanism enables the asymmetric distribution of security information across the Fabric 80 to achieve load balancing and reliability.

When each client-Switch in the Fabric 80 computes the most direct route toward to the Domain_ID FE, it finds the route toward its nearest server Switch. Each client-Switch therefore effectively communicates with the nearest server Switch in the Fabric. As a result, the requests from the various client-Switches in the Fabric are effectively balanced among the server Switches.

If one of the server Switches fails, the FSPF state machine 32 of all the Switches in the Fabric automatically re-computes the best route toward another server Switch. Thus a high degree of reliability is achieved because all the server Switches across the Fabric maintain the same security databases.

In an alternative embodiment, not only Switches (client-Switches) access the security databases, but also the end devices directly. This is expected to be extremely useful especially for authentication purposes.

The asymmetric Fabric thus provides a number of advantages. Only server Switches or security appliances maintain the entire Fabric security database. The client-Switches determine for themselves which subset of information from the Fabric security database they need through the Nx_Ports that are directly connected to each client-Switch respectively. A system administrator does not need to pre-allocate the security information to each Switch of the Fabric. Instead, the security information is automatically distributed by the security servers to the client-Switches or the clients on an as needed basis. This model therefore scales better than the replicated model on a large Fabric.

The embodiments of the present invention described above are to be considered as illustrative and not restrictive. The invention is not to be limited to the details given herein, but may be modified within the scope and equivalents of the appended claims.

What is claimed is:

1. An apparatus, comprising:
a server device configured to be used in a Switching Fabric, the server device comprising a first element configured to maintain a virtual Domain_ID for the server device, the virtual Domain_ID identifying the server device within the Switching Fabric,
wherein the Switching Fabric comprises a plurality of security server devices, the server device is one of the plurality of security server devices and the virtual Domain_ID comprises a common virtual security server Domain_ID used by each of the plurality of security server devices,
wherein each of the plurality of security server devices is configured to maintain a copy of a security database for the Switching Fabric, and
wherein the plurality of security server devices advertise their identities to other devices in the Switching Fabric using the common virtual security server Domain_ID, the common virtual security server Domain_ID sent to the other devices in a plurality of link state records (LSRs), wherein using the common virtual security server Domain_ID in the LSRs facilitates load balancing of security server queries from the other devices across the plurality of security server devices, the security server queries directed to the security database.

2. The apparatus of claim 1, wherein the server device is further configured to implement a Merge protocol across the Switching Fabric to harmonize a database of the Fabric with other server devices in the Switching Fabric.

3. The apparatus of claim 1, wherein the server device is further configured to implement a Change protocol across the Switching Fabric when the server device is used to propagate Fabric configuration updates across the Switching Fabric.

4. The apparatus of claim 1, wherein the virtual Domain_ID of the server device is selected from a reserved range of Domain_IDs (F0-FF), as defined by a Domain_ID assignment protocol.

5. The apparatus of claim 1, wherein the virtual Domain_ID of the server device is selected from a normal range of Domain_IDs (1-EF), as defined by a Domain_ID assignment protocol.

6. The apparatus of claim 1, wherein the server device is configured to maintain a Link State Record (LSR) database of all other Switches in the Switching Fabric when the server device is used in the Switching Fabric.

7. The apparatus of claim 1, wherein the server device is configured to maintain a routing table for all Domain_ID's of other Switches in the Switching Fabric when the server device is used in the Switching Fabric.

8. The apparatus of claim 7, wherein the routing table includes an entry for the virtual Domain_ID of the server device.

9. The apparatus of claim 1, wherein the server device further comprises a Domain Assignment state machine configured to implement a FC Domain_ID assignment protocol.

10. The apparatus of claim 1, wherein the server device further comprises a Fabric Shortest Path First (FSPF) state machine configured to implement a FSPF protocol.

11. The apparatus of claim 1, wherein the server device further comprises a server protocol state machine configured to control operation of the server device when used in the Switching Fabric.

12. The apparatus of claim 1, wherein the server device further comprises Switching logic to configure the server device as a Switch for routing traffic when used in the Switching Fabric.

13. The apparatus of claim 1, wherein the Switching Fabric further comprises a plurality of client-Switches.

14. The apparatus of claim 13, wherein each of the client-Switches is configured to maintain a subset of the security information of the entire Switching Fabric, the subset being sufficient for each of the client-Switches to enforce security policies of the Fabric among its ports respectively.

15. The apparatus of claim 13, wherein the client-Switches are configured to address the server device in the Switching Fabric using the virtual Domain_ID of the server device.

16. The apparatus of claim 13, wherein the client-Switches are configured to communicate with and receive the security information from the server device when an Nx_Port performs a Fabric Login (FLOGI) with one of the client-Switches.

17. The apparatus of claim 13, wherein the client-Switches are configured to communicate with and receive the security information from the server device when a new client-Switch is added to the Switching Fabric.

18. The apparatus of claim 13, wherein the client-Switches are configured to communicate with and receive their subset of the security information from the server device when the server device solicits the client-Switches to update their subset of the security information by way of a solicitation message.

19. The apparatus of claim 13, wherein each of the plurality of security server devices in the Switching Fabric implement a Merge protocol to harmonize their copies of the security database respectively.

20. The apparatus of claim 13, wherein each of the plurality of security server devices in the Switching Fabric implement a Change protocol to implement changes to the security database across the Switching Fabric.

21. The apparatus of claim 13, wherein each of the plurality of security server devices in the Switching Fabric are further configured to balance a load of queries from client-Switches in the Switching Fabric by configuring the client-Switch to communicate only with the nearest security server device in the Fabric.

22. The apparatus of claim 13, wherein the plurality of security server devices are further configured to update routing tables of the security server devices and the client-Switches in the Switching Fabric in an event one of the security server devices goes down to improve reliability of the Switching Fabric.

23. The apparatus of claim 1, further comprising an end device coupled to the Switching Fabric, the end device configured to directly query the server device when used in the Switching Fabric.

24. The apparatus of claim 13, wherein a first selected server device among the plurality of security server devices in the Switching Fabric is designated to generate a Link State Record (LSR) for the virtual Domain_ID.

25. The apparatus of claim 24, wherein another server device among the plurality of security server devices in the Switching Fabric is selected and designated to generate the Link State Record (LSR) for the virtual Domain_ID in an event the first selected server device goes down.

26. The apparatus of claim 6, wherein a link to the virtual Domain_ID in the LSR database maintained by the server device is designated with an administrative cost which is higher than that of other links in the Fabric.

27. A method, comprising
generating a link state record (LSR) at a server device, the LSR including a virtual Domain_ID, the virtual Domain_ID identifying the server device within a switch fabric,
wherein the switch fabric comprises a plurality of security server devices, the server device is one of the plurality of security server devices and the virtual Domain_ID comprises a common virtual security server Domain_ID used by each of the plurality of security server devices, and
wherein each of the plurality of security server devices is configured to maintain a copy of a security database for the Switching Fabric;
receiving a plurality of LSRs at the server device; sending out a plurality of LSRs including the common virtual security server Domain_ID, the virtual security server Domain_ID providing the identity of the server device to a plurality of other devices in the switch fabric, wherein using the common virtual security server Domain_ID in the LSRs facilitates load balancing of security server queries from the other devices across the plurality of security server devices, the security server queries directed to the security database.

28. A system, comprising
a hardware unit configured to, either alone or in conjunction with software, generate a link state record (LSR) at a server device, the LSR including a virtual Domain_ID, the virtual Domain_ID identifying the server device within a switch fabric,
the switch fabric comprises a plurality of security server devices, the server device is one of the plurality of security server devices and the virtual Domain_ID comprises a common virtual security server Domain_ID used by each of the plurality of security server devices,
wherein each of the plurality of security server devices is configured to maintain a copy of a security database for the Switching Fabric;
means for receiving a plurality of LSRs at the server device;
means for sending out a plurality of LSRs including the common virtual security server Domain_ID, the virtual security server Domain_ID providing the identity of the server device to a plurality of other devices in the switch fabric, wherein using the common virtual security server Domain_ID in the LSRs facilitates load balancing of security server queries from the other devices across the plurality of security server devices, the security server queries directed to the security database.

29. The apparatus of claim 1, wherein each of the plurality of security server devices in the Switching Fabric maintains a copy of the same security database.

30. The apparatus of claim 1, wherein the plurality of security server devices advertise their identities to the other devices in the Switching Fabric using the common virtual security server Domain_ID by disclosing an adjacency to the virtual Domain_ID in their LSRs.

* * * * *